(12) United States Patent
Watanabe

(10) Patent No.: US 10,962,813 B2
(45) Date of Patent: Mar. 30, 2021

(54) OPTICAL ISOLATOR MODULE

(71) Applicant: SHIN-ETSU CHEMICAL CO., LTD., Tokyo (JP)

(72) Inventor: Toshiaki Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 158 days.

(21) Appl. No.: 15/972,321

(22) Filed: May 7, 2018

(65) Prior Publication Data

US 2019/0004343 A1   Jan. 3, 2019

(30) Foreign Application Priority Data

Jun. 29, 2017  (JP) .............................. JP2017-127849

(51) Int. Cl.
  *G02F 1/09*  (2006.01)

(52) U.S. Cl.
  CPC .......... *G02F 1/093* (2013.01); *G02F 2201/16* (2013.01); *G02F 2201/18* (2013.01); *G02F 2203/06* (2013.01)

(58) Field of Classification Search
  CPC ..... G02B 5/3025; G02F 1/0036; G02F 1/093; G02F 2203/06; G20F 2201/18
  USPC .............................. 359/282, 484.03; 372/703
  See application file for complete search history.

(56) References Cited

U.S. PATENT DOCUMENTS

| | | | |
|---|---|---|---|
| 4,756,607 A * | 7/1988 | Watanabe | ............... G02F 1/093 359/282 |
| 4,988,170 A | 1/1991 | Buhrer | |
| 5,105,307 A | 4/1992 | Nishiyama et al. | |
| 5,278,853 A * | 1/1994 | Shirai | .................. G02B 6/2746 372/37 |
| 5,345,329 A * | 9/1994 | Shirai | ..................... G02F 1/093 359/282 |

(Continued)

FOREIGN PATENT DOCUMENTS

| EP | 0279412 | * | 8/1988 |
|---|---|---|---|
| EP | 0 390 604 A2 | | 10/1990 |

(Continued)

OTHER PUBLICATIONS

Nov. 20, 2018 Search Report Issued in European Patent Application No. 18176936.5.

(Continued)

*Primary Examiner* — Ricky D Shafer
(74) *Attorney, Agent, or Firm* — Oliff PLC

(57) ABSTRACT

The present invention provides an optical isolator module, including: a plurality of optical devices, each comprising a Faraday rotator and being configured to have an optical isolator function upon application of a magnetic field, a magnet to apply the magnetic field to the Faraday rotator in each of the plurality of optical devices, wherein at least two optical devices of the plurality of optical devices are configured to have the optical isolator functions in different directions from each other, and each magnetic field applied with the magnet is in the same direction. This provides an optical isolator module that can be prevented from degradation of the performance such as increase of insertion loss and degradation of isolation due to magnetic field interference even when a plurality of optical isolators are close to each other.

4 Claims, 13 Drawing Sheets

(56) References Cited

U.S. PATENT DOCUMENTS

| | | | | |
|---|---|---|---|---|
| 5,381,261 | A | * | 1/1995 | Hirai ................... G02F 1/093 359/282 |
| 5,402,260 | A | * | 3/1995 | Tsuneda ............. G02B 6/4208 359/282 |
| 5,566,259 | A | * | 10/1996 | Pan ...................... G02F 1/093 359/484.03 |
| 6,028,702 | A | | 2/2000 | Sasaki |
| 6,075,642 | A | * | 6/2000 | Chang ................. G02F 1/093 359/281 |
| 6,288,826 | B1 | * | 9/2001 | Wills .................... G02F 1/093 359/282 |
| 6,600,601 | B1 | * | 7/2003 | Ikari ..................... G02F 1/093 359/281 |
| 7,251,394 | B2 | * | 7/2007 | Sato .................... G02B 6/2746 385/15 |
| 10,539,814 | B2 | * | 1/2020 | Watanabe ............ G02F 1/0036 |
| 2001/0030807 | A1 | * | 10/2001 | Ikari .................... G02B 5/3083 359/484.03 |
| 2003/0002128 | A1 | | 1/2003 | Watanabe |
| 2011/0181950 | A1 | | 7/2011 | Makikawa et al. |
| 2018/0356656 | A1 | * | 12/2018 | Watanabe ............ G02B 27/288 |

FOREIGN PATENT DOCUMENTS

| | | | |
|---|---|---|---|
| EP | 0 707 230 A1 | | 4/1996 |
| JP | 2000-241763 | * | 9/2000 |
| JP | 2003-066372 A | | 3/2003 |
| JP | 2004-177810 A | | 6/2004 |
| JP | 2004198549 | * | 7/2004 |
| JP | 2006-267434 A | | 10/2006 |
| JP | 2011-150208 A | | 8/2011 |

OTHER PUBLICATIONS

Jan. 28, 2020 Notification of Reasons for Refusal issued in Japanese Patent Application No. 2017-127849.

Oct. 1, 2020 Office Action issued in European Patent Application No. 18176936.5.

Aug. 4, 2020 Office Action issued in Japanese Patent Application No. 2017-127849.

* cited by examiner (a)

10   3   4   11

(b)

OPTICAL ISOLATOR MODULE

TECHNICAL FIELD

The present invention relates to an optical isolator module.

BACKGROUND ART

In optical communication and optical measurement, laser oscillation becomes unstable when the light emitted from a semiconductor laser of a light source returns to the semiconductor laser by the reflection from the surface of a component, the tip of a fiber, or the tip of a lens disposed in the transmission path. In order to cut off such reflected return light, an optical isolator has been used, which uses a Faraday rotator to rotate a plane of polarization non-reciprocally (PATENT LITERATURE 1).

An example of a basic constitution of a polarization dependent optical isolator is shown in FIG. 13. The polarization dependent optical isolator is usually configured to dispose a Faraday rotator 3 between two polarizers (the first polarizer 1, the second polarizer 2), and to apply a magnetic field parallel to the light traveling direction to the Faraday rotator 3 with a magnet.

When light enters in a forward direction as in FIG. 13(a), the incident light becomes linearly polarized light by passing through the first polarizer 1 to pass the Faraday rotator 3. The entered linearly polarized light is rotated by 45° through this Faraday rotator 3, and is emitted through the second polarizer 2, which is provided so as to tilt the transmission direction by 45° from the vertical direction.

On the other hand, when light enters in a reverse direction as in FIG. 13(b), the second polarizer 2 transmits only the polarized component that is rotated by 45° from the vertical direction among the various components of the return light. This polarized component is additionally subjected to optical rotation by 45° through the Faraday rotator 3 and becomes polarized light that is perpendicular to the direction of transmission through the first polarizer 1. Accordingly, the light is not returned to the light source.

CITATION LIST

Patent Literature

PATENT LITERATURE 1: Japanese Patent Laid-Open Publication (Kokai) No. 2011-150208

SUMMARY OF INVENTION

Technical Problem

Various polarization processing have been required in semiconductor laser modules while the modules have been miniaturized recently. In some cases, transmitted light in the opposite direction is required to be treated with optical isolators that are adjacent to each other, which has not been conceived.

When a plurality of optical isolators are close to each other, however, there occurs a problem of a magnetic field interference due to the magnets contained in the individual optical isolators. This causes risk of failing to exhibit intrinsic performance of optical isolators, causing increase of insertion loss, degradation of isolation, etc.

The present invention was accomplished in view of the above-described problems. It is an object of the present invention to provide an optical isolator module that can be prevented from degradation of the performance such as increase of insertion loss and degradation of isolation due to magnetic field interference even when a plurality of optical isolators are close to each other.

Solution to Problem

To solve the above problems, the present invention provides an optical isolator module, comprising:

a plurality of optical devices, each comprising a Faraday rotator and being configured to have an optical isolator function upon application of a magnetic field, a magnet to apply the magnetic field to the Faraday rotator in each of the plurality of optical devices, wherein at least two optical devices of the plurality of optical devices are configured to have the optical isolator functions in different directions from each other, and each magnetic field applied with the magnet is in the same direction.

Such an optical isolator module can be an optical isolator module capable of preventing degradation of the performance such as increase of insertion loss and degradation of isolation due to magnetic field interference even when a plurality of optical isolators are close to each other.

In this case, it is preferable that the optical device further comprise a polarizer.

The optical device comprising such a polarizer can be appropriately used in the inventive optical isolator module.

It is preferable that at least two optical devices of the plurality of optical devices be configured to have the optical isolator functions in the opposite directions to each other.

In the inventive optical isolator module, comprising such optical devices, every optical devices can exhibit high performance.

The number of the optical devices can be two.

The constitution of the inventive optical isolator module can be used favorably when the number of the optical devices is two.

The magnet is preferably the sole magnet.

The inventive optical isolator module can be easily assembled by using such a single magnet.

It is preferable that the plurality of optical devices be set on a plane of a flat base, and a polarization direction of outgoing light in a forward direction be parallel to the plane of the flat base.

The optical isolator module, comprising such an optical devices, can be easily installed when it is used in combination with a waveguide modulator with incident polarization dependency.

It is preferable that each of the plurality of optical devices be tilted in the same tilt direction and is configured such that an individual incident surface of the plurality of optical devices is tilted away from a plane that is perpendicular to a transmission direction of light.

The optical isolator module comprising optical devices constituted as described above can prevent one of the optical devices from being influenced by residual reflection from another optical device.

Advantageous Effects of Invention

The inventive optical isolator module can help semiconductor laser modules and so on to be more miniaturized and more space saving, and can perform a transmitted light process in different directions in adjacent positions without causing performance degradation due to magnetic field interference.

DESCRIPTION OF EMBODIMENTS

The present inventor has diligently studied to accomplish the foregoing problems and consequently found that performance degradation such as increase of insertion loss and degradation of isolation due to magnetic field interference can be prevented by comprising a plurality of optical devices each configured to have an optical isolator function upon application of a magnetic field, and by configuring the individual optical devices to have the optical isolator functions in different directions from each other while applying magnetic fields in the same direction; thereby brought the present invention to completion.

That is, the present invention is an optical isolator module, comprising:

a plurality of optical devices, each comprising a Faraday rotator and being configured to have an optical isolator function upon application of a magnetic field, a magnet to apply the magnetic field to the Faraday rotator in each of the plurality of optical devices, wherein at least two optical devices of the plurality of optical devices are configured to have the optical isolator functions in different directions from each other, and each magnetic field applied with the magnet is in the same direction.

Hereinafter, the present invention will be explained in detail by referring to FIGS., but the present invention is not limited thereto.

Figure 1:
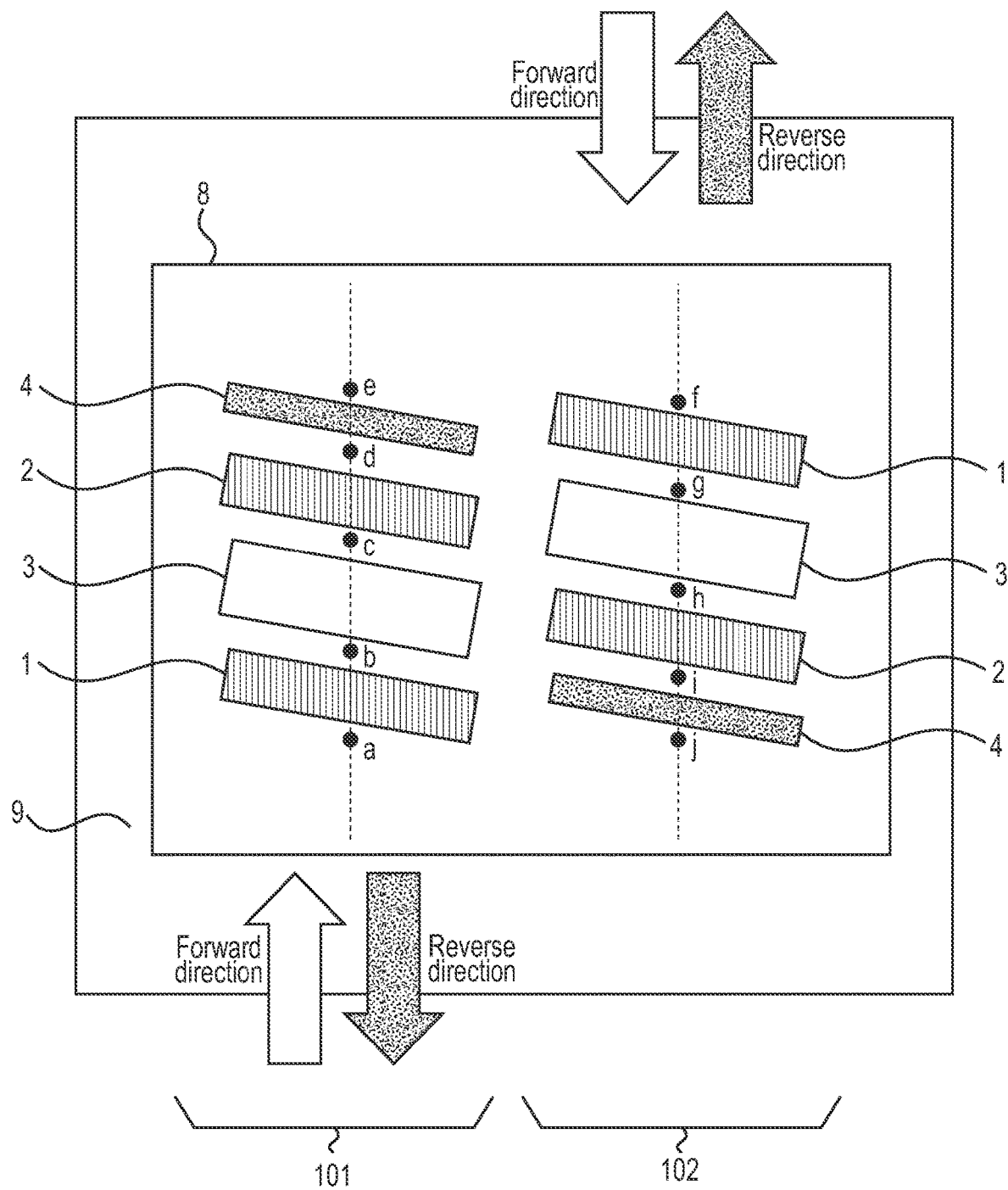
FIG. 1 is a schematic top view showing an example of the constitution of the inventive optical isolator module.
Figure 7:
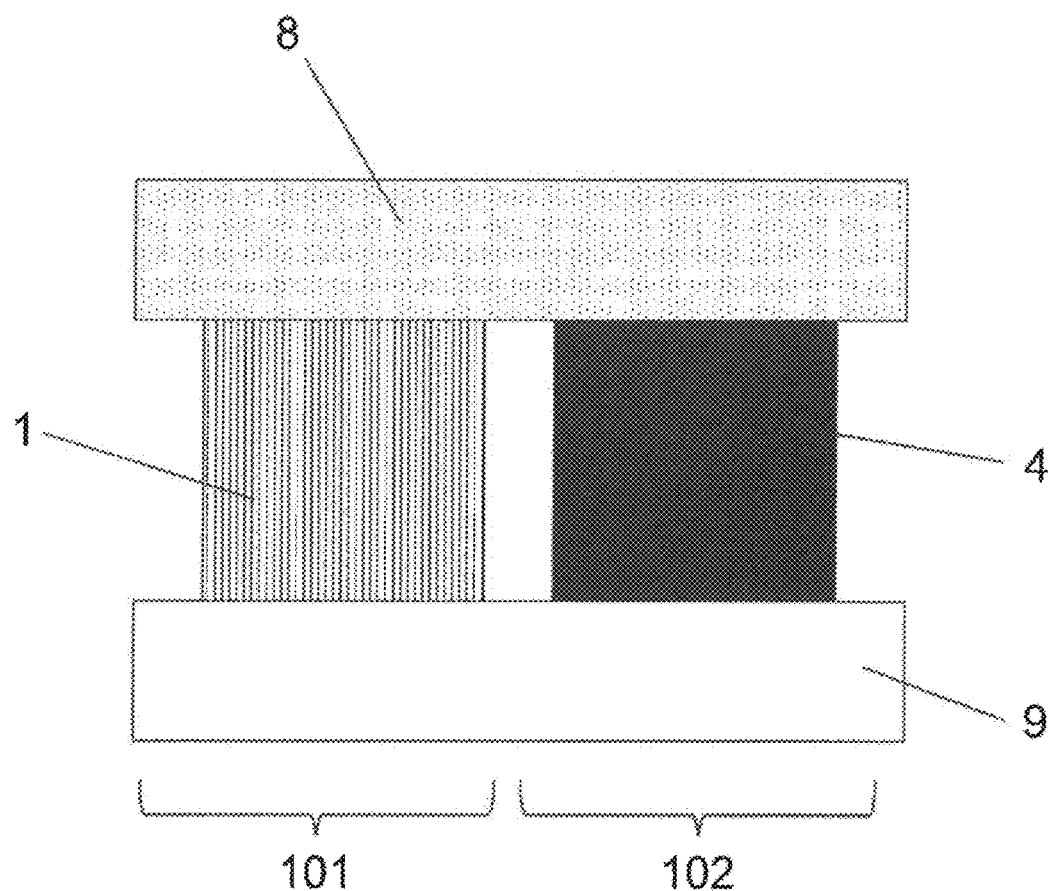
FIG. 7 is a schematic front view showing an example of the constitution of the inventive optical isolator module.
Figure 8:
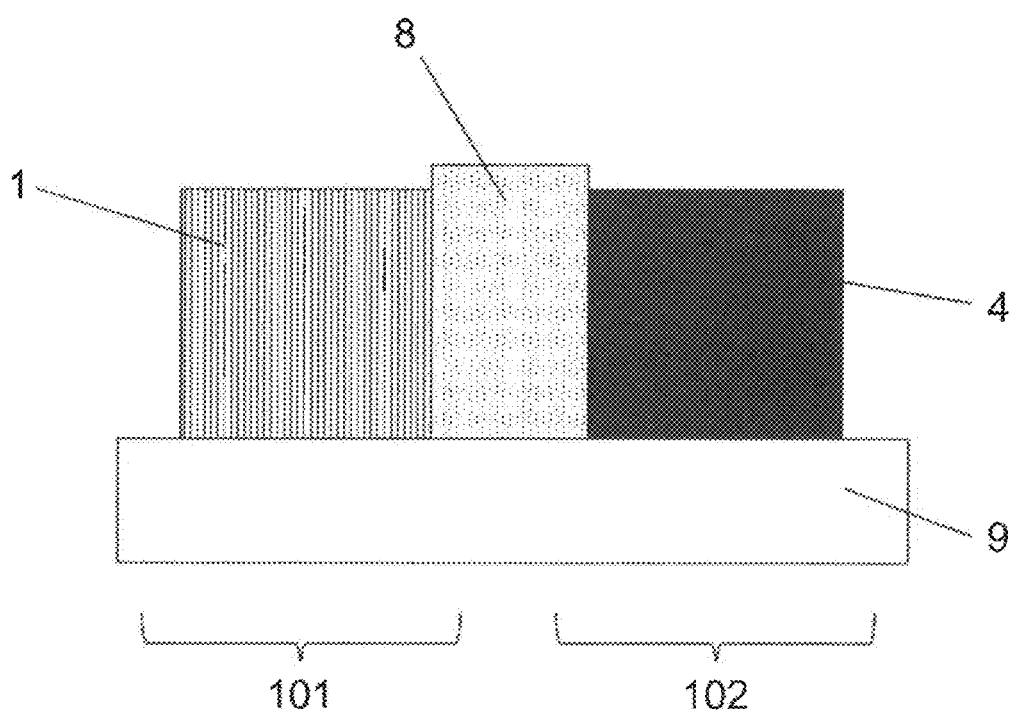
FIG. 8 is a schematic front view showing another example of the constitution of the inventive optical isolator module.

FIG. 1 is a schematic top view showing an example of the constitution of the inventive optical isolator module. An example of the constitution of the inventive optical isolator module is shown in FIGS. 7 and 8 as schematic front views.

The inventive optical isolator module comprises a plurality of optical devices each having an optical isolator function upon application of a magnetic field. The number of the optical devices can be two or more.

The optical device, although the specific constitution is not limited, is configured to function as a polarization dependent optical isolator upon application of a magnetic field, for example. In this case, as shown in FIG. 1, each of the optical devices 101 and 102 comprises the Faraday rotator 3 and two polarizers (the first polarizer 1, the second polarizer 2), usually having a constitution in which the Faraday rotator 3 is disposed between the two polarizers. Hereinafter, the optical device 101 and the optical device 102 in FIG. 1 are called the optical device (I) and the optical device (II) respectively for convenience.

The optical device can be combined with an optional element(s) such as a ½ wave plate 4 disposed at the outgoing side to adjust the polarization direction of outgoing light when a waveguide modulator having incident polarization dependency is disposed next to the optical isolator.

Figure 2:
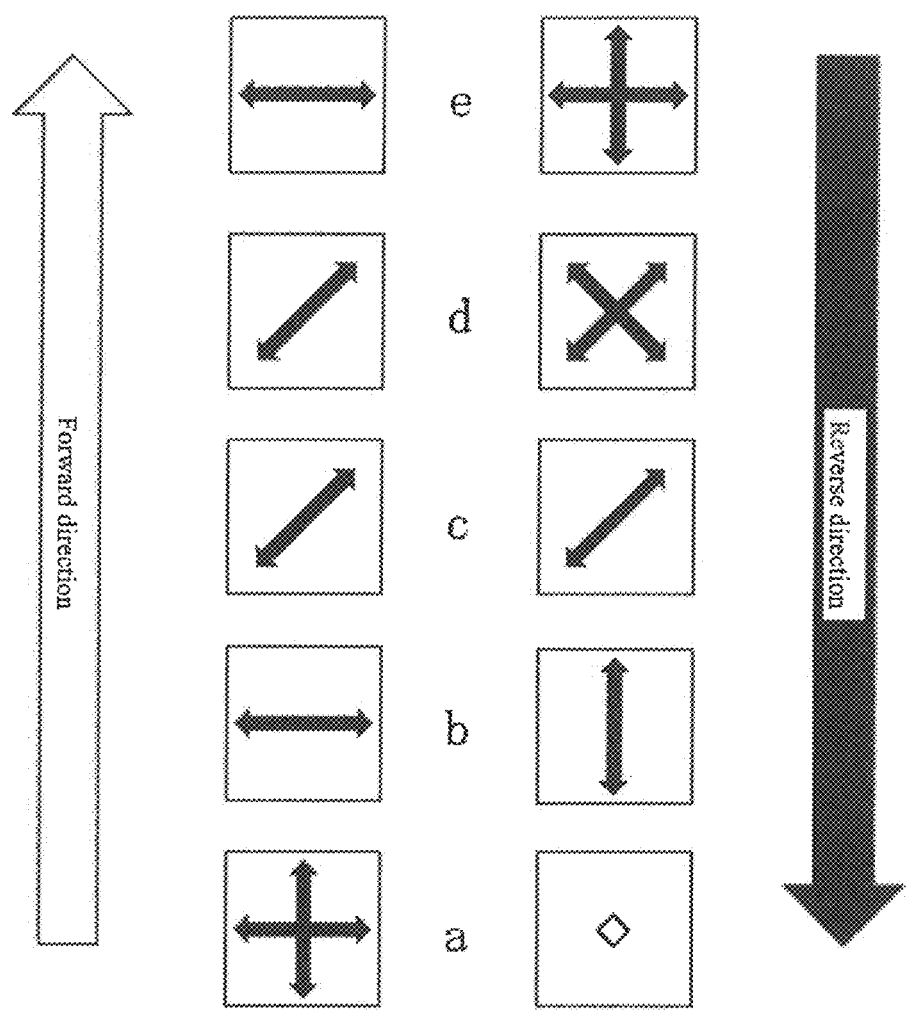
FIG. 2 is a schematic view showing an example of transmission polarization directions in the optical device (I) in FIG. 1.
Figure 3:
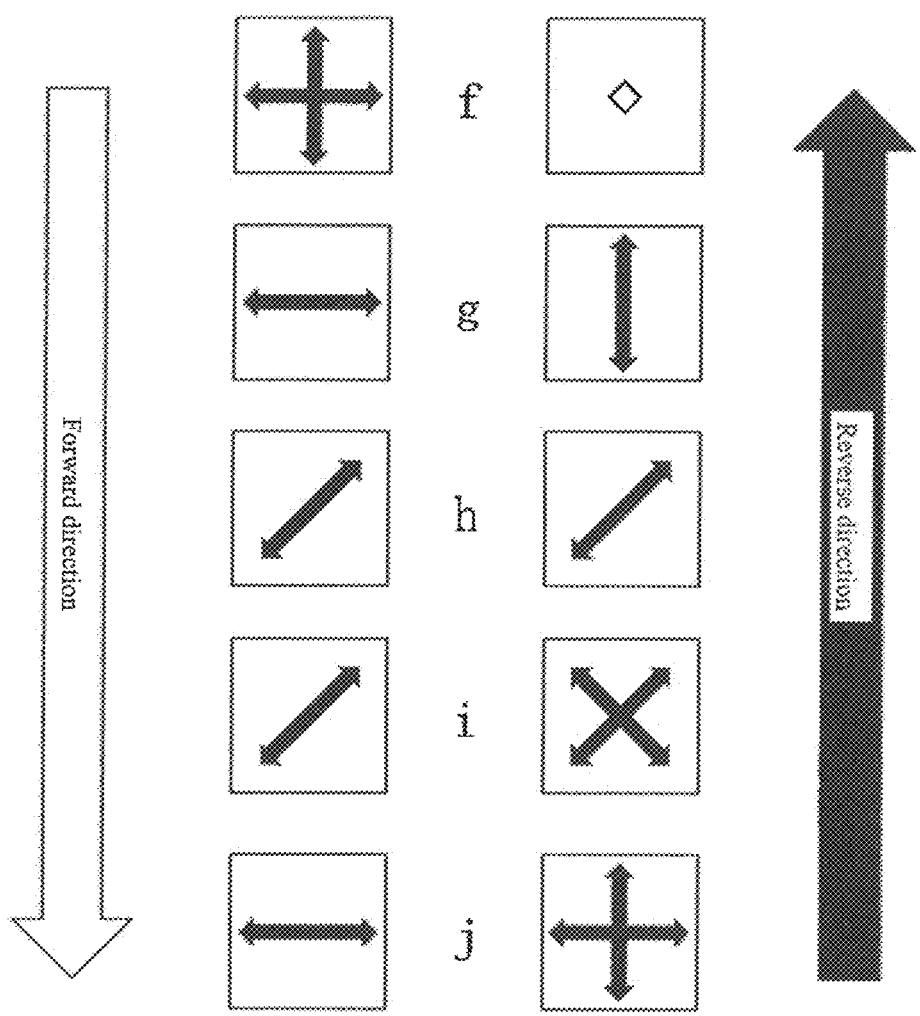
FIG. 3 is a schematic view showing an example of transmission polarization directions in the optical device (II) in FIG. 1.

The schematic views of FIGS. 2 and 3 respectively show individual examples of transmission polarization directions in the optical devices (I) and (II) in FIG. 1. The bidirectional arrows in FIGS. 2 and 3 schematically show transmission polarization directions when the optical devices are viewed in the forward direction. The points "a"-"e" in FIG. 1 correspond to the points "a"-"e" in FIG. 2, and the points "f"-"j" in FIG. 1 correspond to the points "f"-"j" in FIG. 3. As shown in FIGS. 2 and 3, every optical device in the present invention is configured to transmit light in a forward direction and not to transmit light in a reverse direction.

Figure 4:
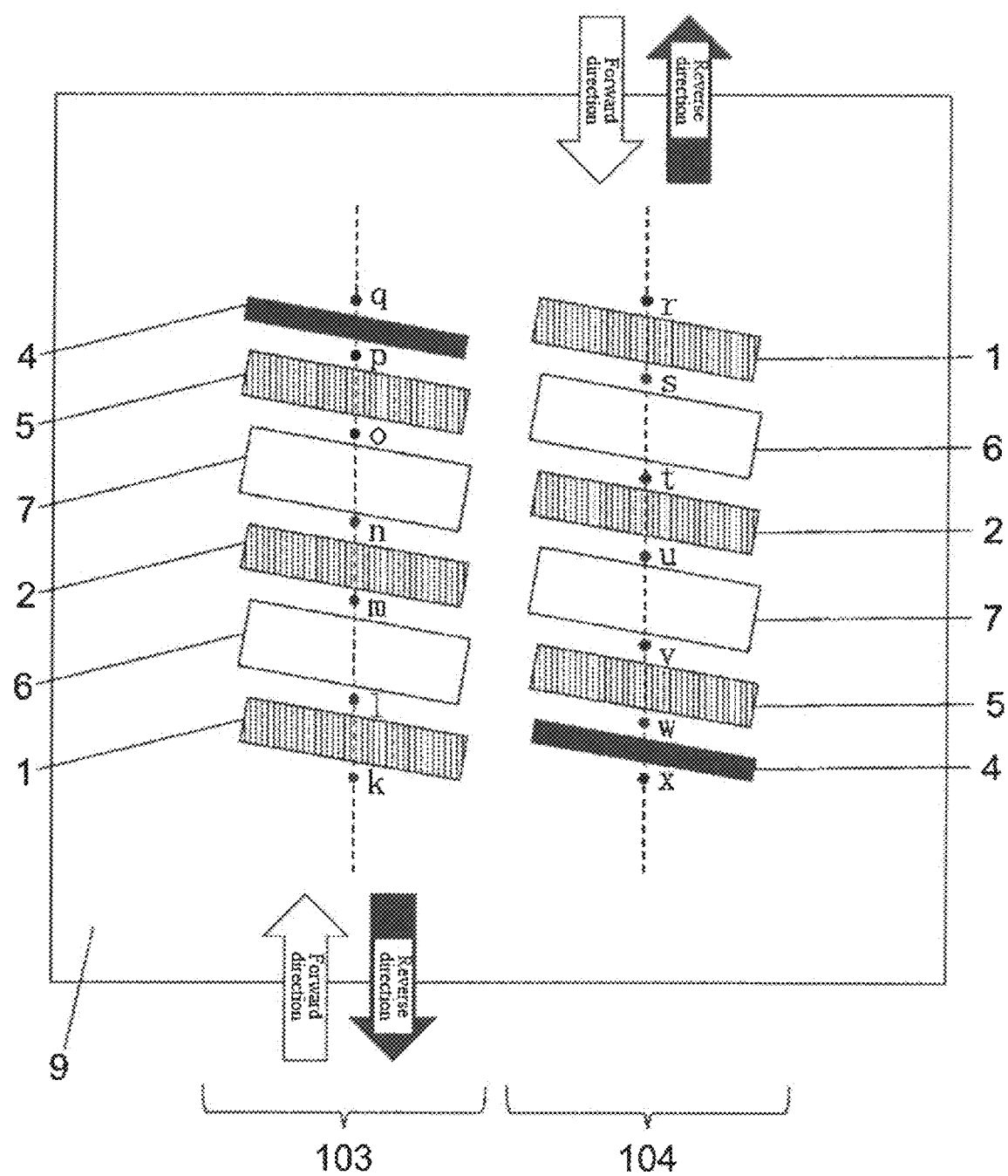
FIG. 4 is a schematic top view showing another example of the constitution of the inventive optical isolator module.
Figure 5:
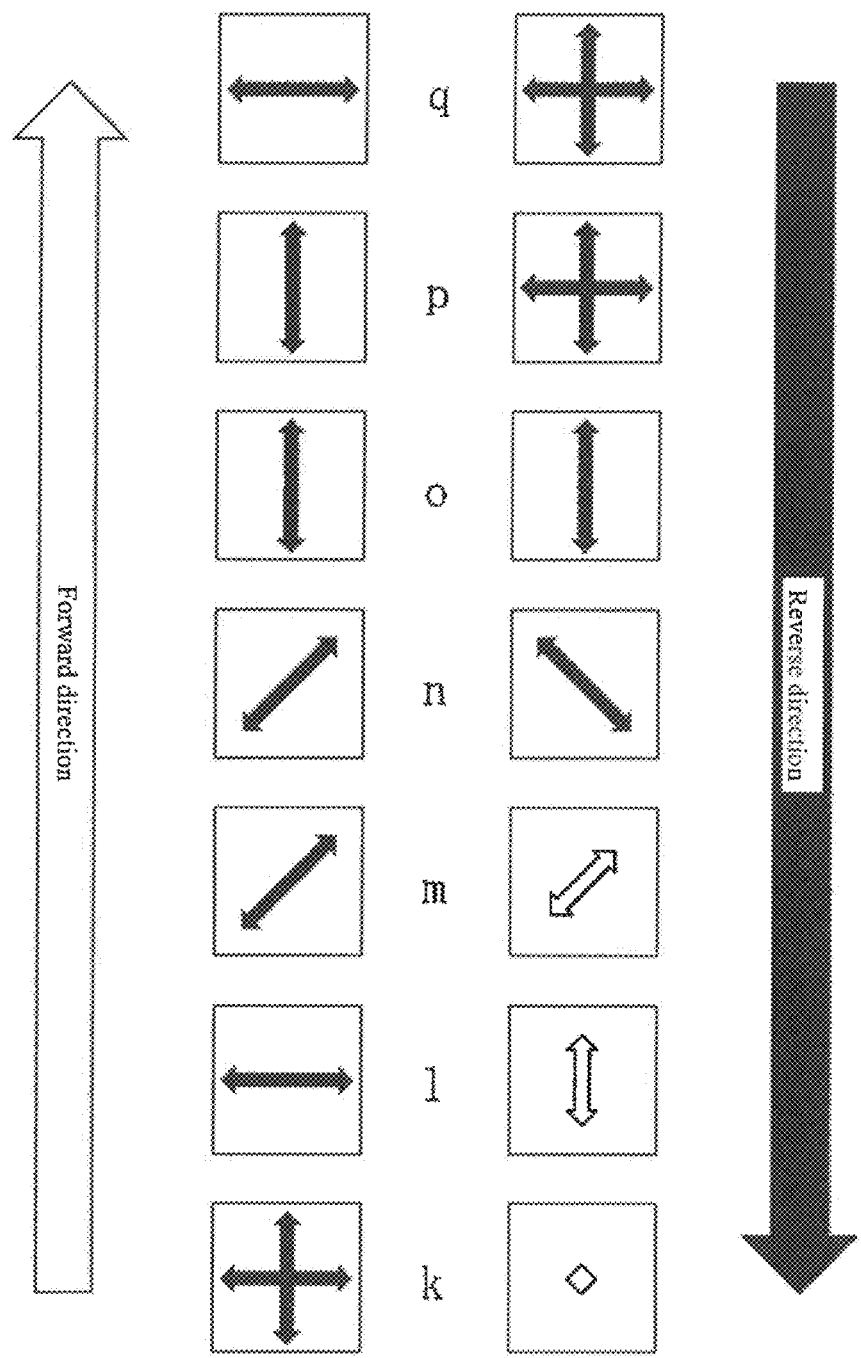
FIG. 5 is a schematic view showing an example of transmission polarization directions in the optical device (III) in FIG. 4.
Figure 6:
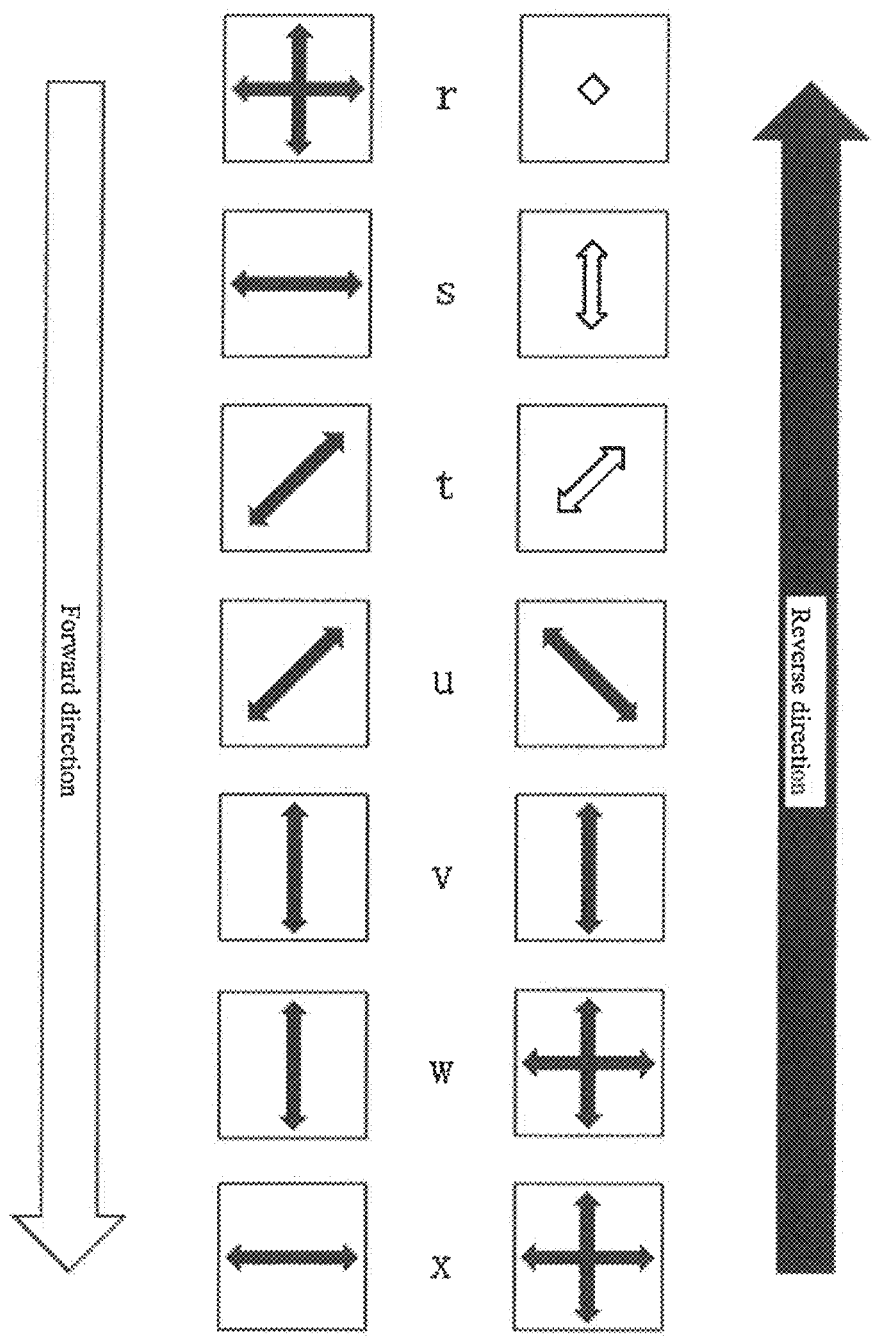
FIG. 6 is a schematic view showing an example of transmission polarization directions in the optical device (IV) in FIG. 4.

The optical device can have a constitution of 1.5-stages type or 2-stages type. The top schematic view, FIG. 4, shows an example of a constitution of the inventive optical isolator module comprising a 1.5-stages type optical device. The schematic views, FIGS. 5 and 6, show examples of transmission polarization directions in the optical devices (III) and (IV) in FIG. 4 respectively (the optical device 103 and the optical device 104 in FIG. 4 are referred to as the optical device (III) and the optical device (IV) for convenience respectively). The bidirectional arrows in FIGS. 5 and 6 schematically show transmission polarization directions when the optical devices are viewed in the forward direction. The points "k"-"q" in FIG. 4 correspond to the points "k"-"q" in FIG. 5, and the points "r"-"x" in FIG. 4 correspond to the points "r"-"x" in FIG. 6. In the 1.5-stages construction, the first polarizer 1, the first Faraday rotator 6, the second polarizer 2, the second Faraday rotator 7, and the third polarizer 5 are disposed in this order on the transmission passage of light. In the 2-stages type construction, the first polarizer, the first Faraday rotator, the second polarizer, the third polarizer, the second Faraday rotator, and the fourth polarizer are disposed in this order on the transmission passage of light.

The inventive optical isolator module comprising a 1.5-stages type or 2-stages type optical device is used preferably when a tunable laser light source is used or high isolation is necessary.

Figure 14:
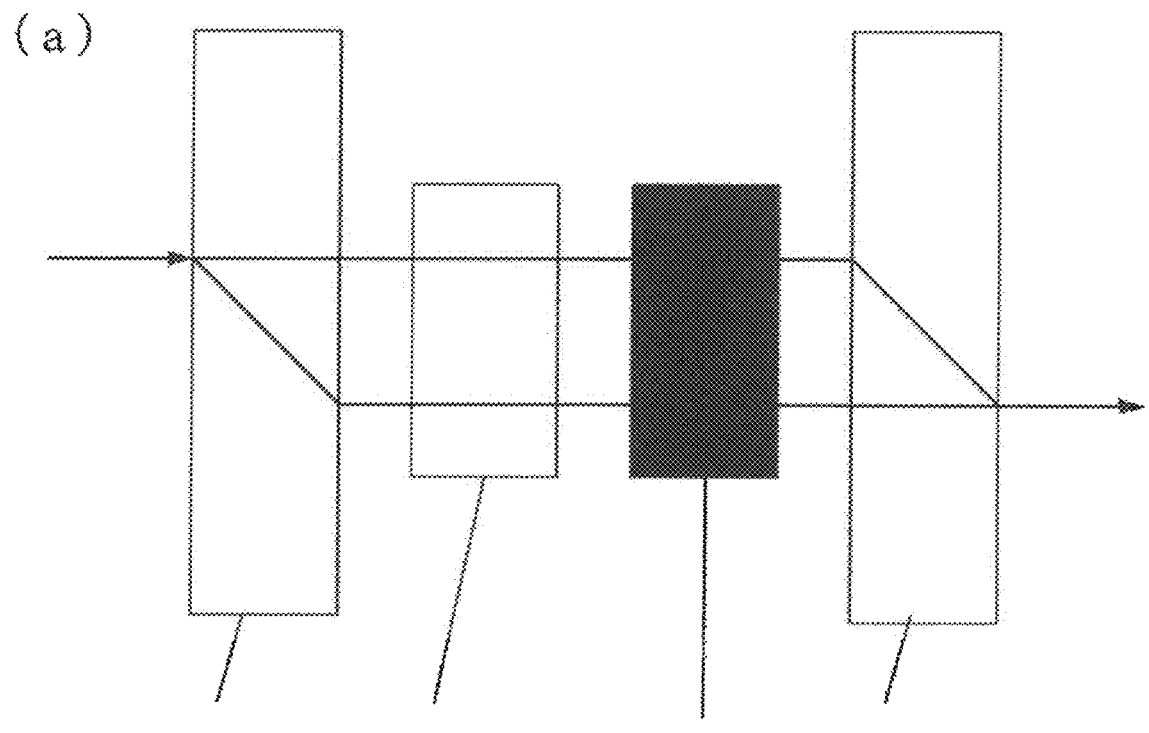
FIG. 14 are schematic drawings to illustrate the constitution of a polarization independent optical isolator, wherein (a) is a schematic drawing when light enters to the polarization independent optical isolator in a forward direction, and (b) is schematic drawing when light enters to the polarization independent optical isolator in a reverse direction.
Figure 14:
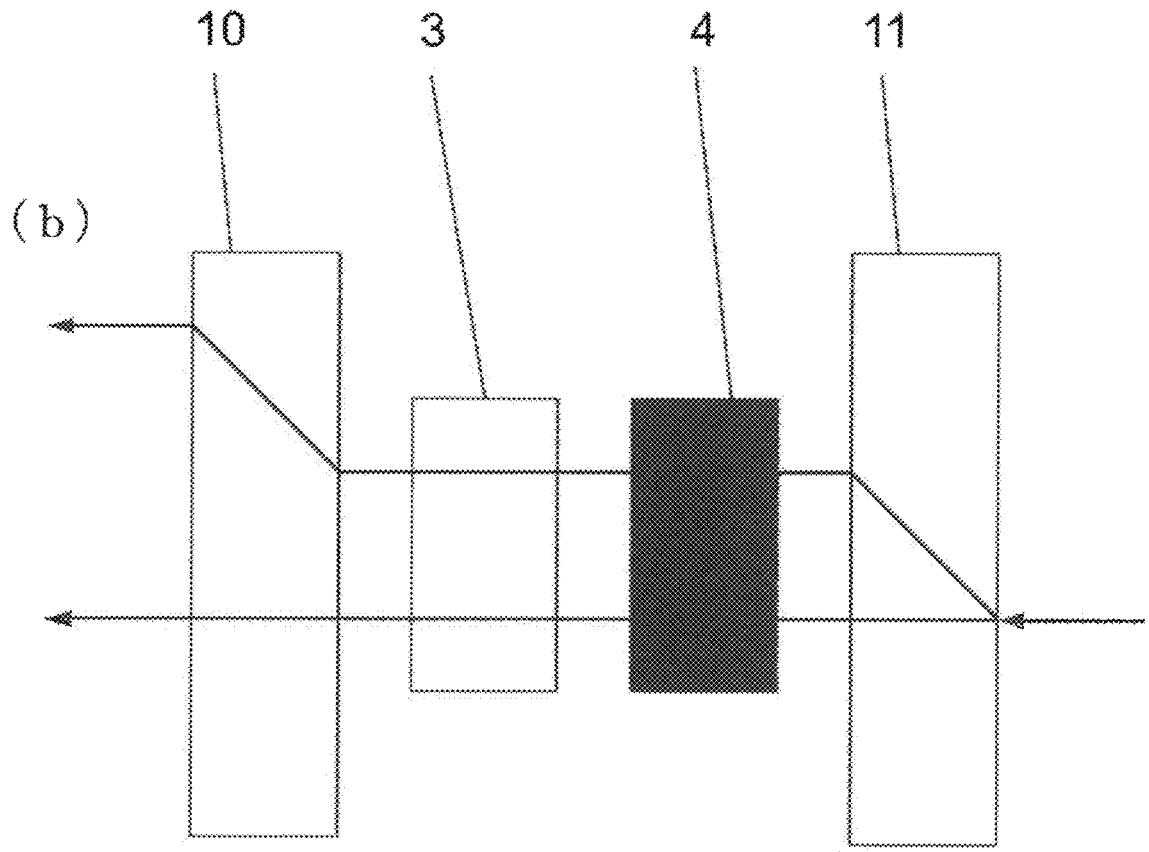

The optical device can be configured to function as a polarization independent optical isolator upon application of a magnetic field. FIG. 14 shows an example of basic constitution of the polarization independent optical isolator. The polarization independent optical isolator usually has a constitution in which the Faraday rotator 3 and the ½ wave plate 4 are disposed between the two birefringence crystals (the first birefringence crystal 10, the second birefringence crystal 11).

When light enters in the forward direction as in FIG. 14(a), the incident light is separated to an ordinary ray and an extraordinary ray, the polarization direction of which is perpendicular to that of the ordinary ray, through the first birefringence crystal 10. These rays are rotated by 45° through the Faraday rotator 3, and are additionally rotated by 45° in the same direction through the ½ wave plate 4 to enter to the second birefringence crystal 11. In this case, the directions of polarizations of the ordinary ray and the extraordinary ray are replaced with each other. Accordingly, the separated light are synthesized by passing through the second birefringence crystal 11, and is then emitted.

On the other hand, when light enters in a reverse direction as in FIG. 14(b), return light is separated to an ordinary ray and an extraordinary ray, the polarization direction of which is perpendicular to that of the ordinary ray, through the second birefringence crystal 11 and are rotated by 45° in the ½ wave plate 4, but is rotated by 45° through the Faraday rotator 3 in the reverse direction to that in the ½ wave plate 4, and then enters to the first birefringence crystal 10. In this case, the polarization directions of the ordinary ray and the extraordinary ray are same as those when separated through the second birefringence crystal 11, and accordingly, the separation of the both rays further increases, and the light never returns to the light source.

It is to be noted that the 1.5-stages type or 2-stages type constitution can be adopted even when the optical device is configured to function as a polarization independent optical isolator upon application of a magnetic field.

The Faraday rotator used in the optical device in the present invention can be made from any material that shows Faraday effect, and is not particularly limited. Illustrative examples thereof include bismuth-substituted rare earth-iron garnet $((RBi)_3Fe_5O_{12})$, yttrium-iron garnet $(Y_3Fe_5O_{12})$, terbium-gallium garnet $(Tb_3Ga_5O_{12})$, and Faraday rotation glass. Materials with a large Faraday rotation coefficient or Verdet constant are preferable since they can shorten the Faraday rotator.

In the present invention, the kind of the polarizer used in the optical device is not particularly limited, and it is possible to use polarizing glass, polarization beam splitter (PBS), a prism type polarizer using a birefringence crystal, and a wire grid type polarizer. Among them, polarizing glass is preferable since it can shorten the optical path length.

The elements of the optical device (a Faraday rotator, a polarizer, a ½ wave plate, a birefringence crystal, etc.) can be set via adhesive, etc. The transmission surface of each element is preferably provided with an antireflection film in accordance with the adjacent material.

The plurality of optical devices contained in the inventive optical isolator module may be constituted identically or differently from each other.

The inventive optical isolator module comprises the magnet 8 to apply a magnetic field to the Faraday rotators in the plurality of optical devices (see FIGS. 7, 8). Although the magnet 8 may be a single magnet or a combination of a plurality of magnets, the applied magnetic fields have to be in the same direction. It is to be noted that use of a single magnet is preferable.

The kind of the magnet is not particularly limited, and a SmCo magnet, an Nd—Fe—B magnet, and an injection-molded magnet (bonded magnet), etc. can be used. Among them, SmCo magnet is preferable since it has a high Curie temperature and hardly rusts. Although the shape of the magnet is not particularly limited, use of a flat-shape magnet is preferable for facilitating the assemblage.

The magnet 8 can be disposed at any place such as the upper end of an optical device and a space between optical devices. For example, the assemblage becomes very easy when the magnet is disposed at the upper end of an optical device as shown in FIG. 7. There arises a merit to cut off stray light when the magnet is disposed between optical devices as shown in FIG. 8.

In the inventive optical isolator module, at least two optical devices of the plurality of optical devices are configured to have the optical isolator functions in different directions from each other. Herein, the direction of optical isolator function refers to a forward direction that can transmit incident light.

It is preferable that at least two optical devices of the plurality of optical devices be configured to have the optical isolator functions in the opposite directions to each other. In this case, these optical devices preferably have optical axes that are parallel with each other since each of which can exhibit high performance in a magnet field in the same direction.

The optical device is preferably set on a plane of the flat base 9 as in FIGS. 1, 4, 7, and 8. In this case, it is more preferable that polarization direction of outgoing light in a forward direction is parallel to the plane of the flat base 9 as in FIGS. 2, 3, 5, and 6. This facilitates the installation when it is used in combination with a waveguide modulator with incident polarization dependency, etc.

Incidentally, although the material used for the flat base 9 is not particularly limited, the use of material with high thermal conductivity such as alumina is preferable in view of radiation.

It is preferable that each incident surface of the optical devices be tilted away from a plane that is perpendicular to a transmission direction of light, and it is more preferable that each incident surface of the optical devices be tilted in the same tilt direction as in FIGS. 1 and 4. In this case, the tilt direction and the tilt angle of each incident surface of the optical devices are appropriately selected so as to prevent one of the optical devices from being affected by residual reflection from another optical device.

The inventive optical isolator module as described above can be prevented from degradation of the performance such as increase of insertion loss and degradation of isolation due to magnetic field interference even when a plurality of optical isolators are close to each other.

EXAMPLES

Hereinafter, the present invention will be explained more specifically by showing Examples, and Comparative Example, but the present invention is not limited thereto.

Example 1

In Example 1, the optical isolator module shown in FIG. 1 was produced by using a $(TbEuBi)_3(FeGa)_5O_{12}$ crystal as a Faraday rotator and polarizing glass (Polacor manufactured by Corning incorporated) as a polarizer. The optical devices (I) and (II) was configured to have transmission polarization directions shown in FIGS. 2 and 3 respectively. The following shows detailed production procedure of the optical isolator module of Example 1.

First, a polarizing glass (the first polarizer 1) of 11.0 mm×11.0 mm×0.2 mm was prepared and was subjected to antireflection coating against air on one surface thereof and antireflection coating against adhesive on the other surface. Then, onto the surface of the first polarizer 1 subjected to the antireflection coating against adhesive, the Faraday rotator 3 of 11.0 mm×11.0 mm×0.54 mm having antireflection coatings against adhesive on the both surfaces was bonded via adhesive.

Onto the surface of the Faraday rotator 3 without being bonded with the first polarizer 1, a polarizing glass (the second polarizer 2) of 11.0 mm×11.0 mm×0.2 mm having antireflection coatings against adhesive on the both surface was bonded via adhesive.

Subsequently, a quartz ½ wave plate 4 was prepared, one of the surface of which had been subjected to antireflection coating against air, and the other surface of which had been subjected to antireflection coating against adhesive. Onto the surface of the second polarizer 2 without being bonded with the Faraday rotator 3, the surface of the ½ wave plate 4 having the antireflection coating against adhesive was bonded via adhesive.

Then, this was cut into a size of 1.0 mm×1.0 mm to produce an optical device. In this case, the first polarizer 1 and the second polarizer 2 were configured to have transmission polarization directions being relatively different by 45°.

Two of the produced optical devices were disposed on the plane of a flat base 9 made from alumina. In this case, the two optical devices 101 and 102 were disposed so as to have optical isolator functions in the opposite directions to each other. The incident surfaces of the optical devices 101 and 102 were tilted away from a plane being perpendicular to a transmission direction of light, and the incident surfaces of the optical devices 101 and 102 each had a tilt direction in the same direction.

On the upper ends of the two optical devices 101 and 102, a flat-shape SmCo magnet (the magnet 8) was disposed to produce an optical isolator module in a constitution of surface mount technology (SMT) as shown in FIG. 7. It is to be noted that the Faraday rotator 3 and the intensity of the magnetic field were set so as to have a Faraday rotation angle of 45° upon transmission of light on a wavelength of 1550 nm at 25° C.

Every optical isolator was constituted so as to transmit light in the forward direction and not to transmit light in the reverse direction as shown in FIGS. 2 and 3. They were each constituted so as to have outgoing light in a forward direction with the polarization direction being parallel to the plane of the base 9 through the ½ wave plate 4.

On the produced optical isolator module, the insertion loss and the isolation were evaluated. The insertion loss of the optical device (I) 101 was 0.15 dB in the forward direction. The insertion loss was 43 dB when it was measured for transmitted light entered in a reverse direction in order to evaluate the isolation, wherein the polarized light had the same direction with the transmission polarization direction of the second polarizer 2 after passing the ½ wave plate 4.

The insertion loss of the optical device (IT) 102 was 0.16 dB when it was evaluated in the forward direction in the same way as in the above. The insertion loss was 43 dB when light entered in a reverse direction.

Example 2

In Example 2, the optical isolator module shown in FIG. 4 was produced by using the same Faraday rotator and polarizing glass as those used in Example 1. The optical devices (III) and (IV) were configured to have transmission polarization directions shown in FIGS. 5 and 6 respectively. The following shows a detailed production method of the optical isolator module of Example 2.

First, a polarizing glass (the first polarizer 1) of 11.0 mm×11.0 mm×0.2 mm was prepared and was subjected to antireflection coating against air on one surface thereof and antireflection coating against adhesive on the other surface. Then, onto the surface of the first polarizer 1 subjected to the antireflection coating against adhesive, a $(TbEuBi)_3(FeGa)_5O_{12}$ crystal (the first Faraday rotator 6) of 11.0 mm×11.0 mm×0.54 mm having antireflection coatings against adhesive on the both surfaces was bonded via adhesive.

Onto the surface of the first Faraday rotator 6 without being bonded with the first polarizer 1, a polarizing glass (the second polarizer 2) of 11.0 mm×11.0 mm×0.2 mm having antireflection coatings against adhesive on the both surface was bonded via adhesive.

Subsequently, onto the surface of the second polarizer 2 without being bonded with the first Faraday rotator 6, a $(TbEuBi)_3(FeGa)_5O_{12}$ crystal (the second Faraday rotator 7) of 11.0 mm×11.0 mm×0.54 mm having antireflection coatings against adhesive on the both surfaces was bonded via adhesive.

Further, onto the surface of the second Faraday rotator 7 without being bonded with the second polarizer 2, a polarizing glass (the third polarizer 5) of 11.0 mm×11.0 mm×0.2 mm having antireflection coatings against adhesive on the both surface was bonded via adhesive.

Subsequently, a quartz ½ wave plate 4 was prepared, one of the surface of which had been subjected to antireflection coating against air, and the other surface of which had been subjected to antireflection coating against adhesive. Onto the surface of the third polarizer 5 without being bonded with the second Faraday rotator 7, the surface of the ½ wave plate 4 having the antireflection coating against adhesive was bonded via adhesive.

Then, this was cut into a size of 1.0 mm×1.0 mm to produce an optical device. In this case, the first polarizer 1 and the second polarizer 2, together with the second polarizer 2 and the third polarizer 3 were constituted so as to have transmission polarization directions that were relatively different by 45° each.

Two of the produced optical devices were disposed on the plane of a flat-shaped base 9 made from alumina. In this case, the two optical devices 103 and 104 were disposed so as to have optical isolator functions in the opposite directions to each other. The incident surfaces of the optical devices 103 and 104 were tilted away from a plane being perpendicular to a transmission direction of light, and the incident surfaces of the optical devices 103 and 104 each had a tilt direction in the same direction.

On the upper ends of the two optical devices 103 and 104, a flat-shape SmCo magnet (the magnet 8) was disposed to produce an optical isolator module in a constitution of surface mount technology (SMT) as shown in FIG. 7. It is to be noted that each of the Faraday rotators 6 and 7 as well as the intensity of the magnetic field were set so as to have a Faraday rotation angle of 45° upon transmission of light on a wavelength of 1550 nm at 25° C.

Every optical isolator was constituted so as to transmit light in the forward direction and not to transmit light in the reverse direction as shown in FIGS. 5 and 6. They were each constituted so as to have outgoing light in a forward direction with the polarization direction being parallel to the plane of the flat base 9 through the ½ wave plate 4.

On the produced optical isolator module, the insertion loss and the isolation were evaluated. The insertion loss of the optical device (III) 103 was 0.23 dB in the forward direction. The insertion loss was 58 dB when it was measured for transmitted light entered in a reverse direction in order to evaluate the isolation, wherein the polarized light had the same direction with the transmission polarization direction of the third polarizer 5 after passing the ½ wave plate 4.

The insertion loss of the optical device (IV) 104 was 0.23 dB when it was measured in the forward direction in the same way as in the above. The insertion loss was 58 dB when light entered in a reverse direction.

Comparative Example 1

Figure 9:
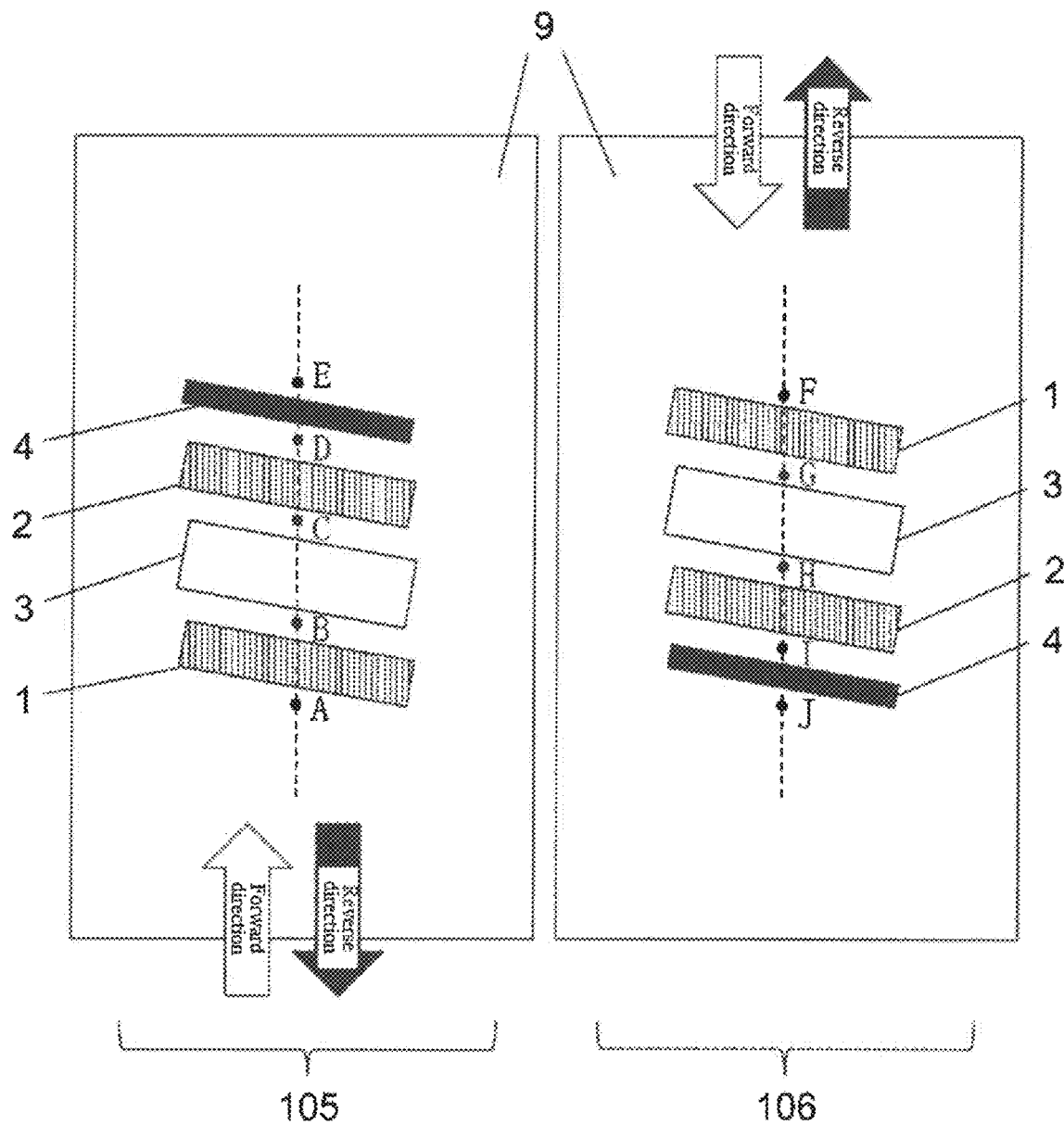
FIG. 9 is a schematic top view of the optical isolator module of Comparative Example 1.
Figure 10:
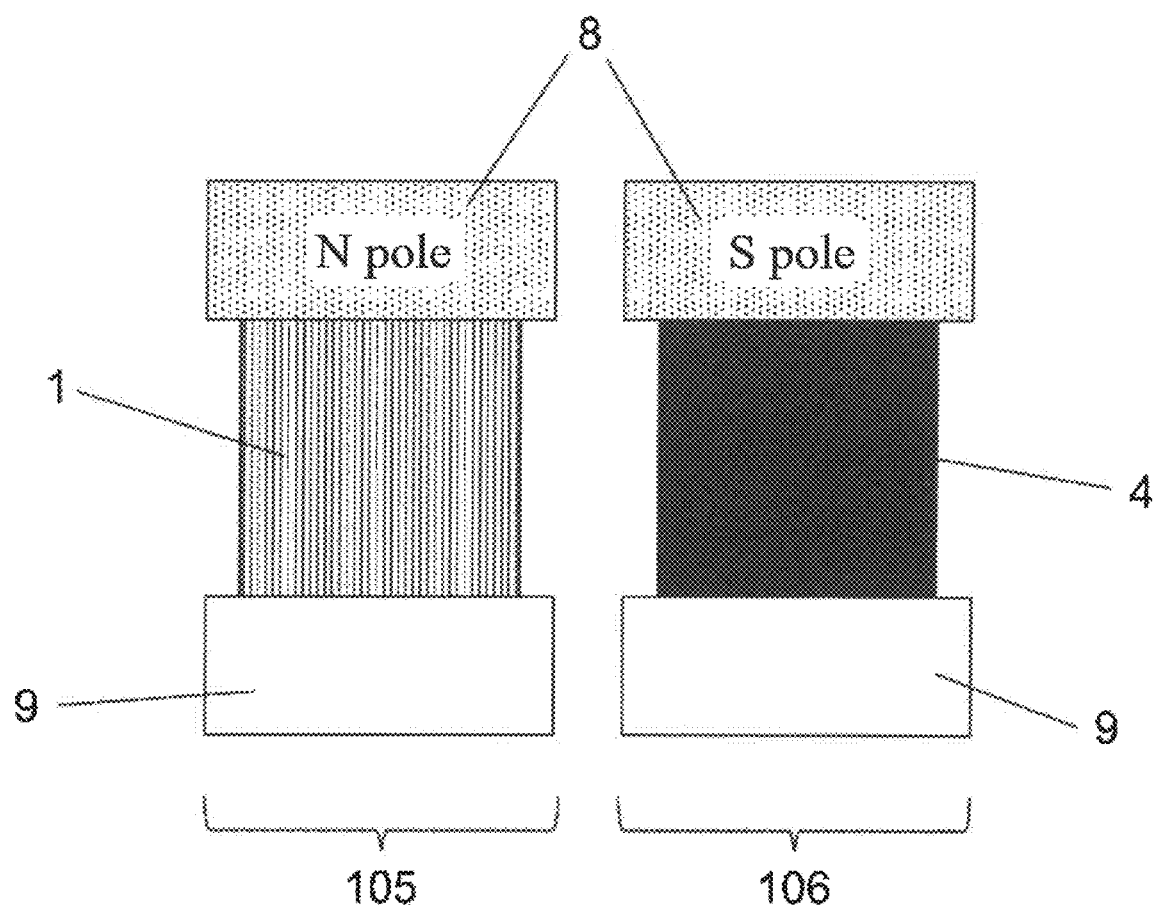
FIG. 10 is a schematic front view of the optical isolator module of Comparative Example 1.

In Comparative Example 1, the optical isolator module shown in FIGS. 9 and 10 was produced by using the same optical devices as those used in Example 1. One optical device was disposed on the plane of a flat base 9 made from alumina. On the upper end of the optical device, a flat-shape SmCo magnet (the magnet 8) was additionally disposed to produce an optical isolator in a constitution of surface mount technology (SMT). In the same way, two of the optical isolators were produced. It is to be noted that the Faraday rotator 3 and the intensity of the magnetic field were set so as to have a Faraday rotation angle of 45° upon transmission of light on a wavelength of 1550 nm at 25° C.

Figure 11:
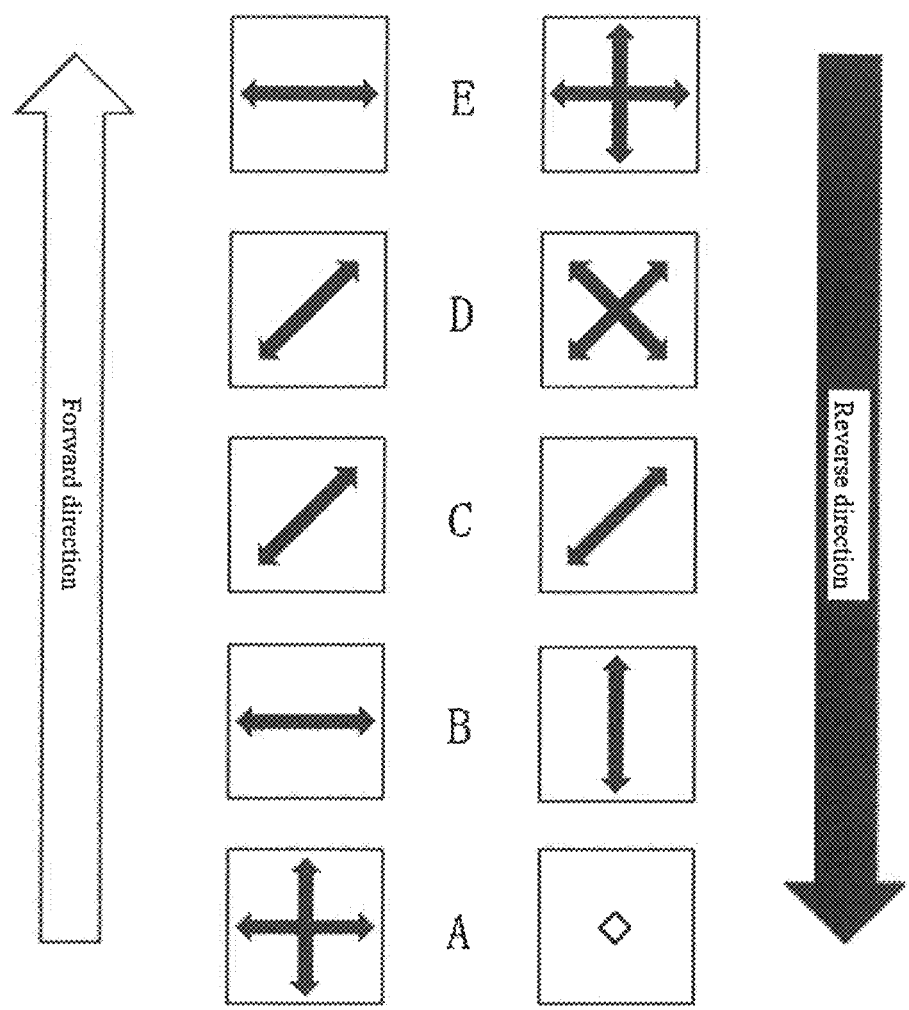
FIG. 11 is a schematic view showing transmission polarization directions in the optical isolator (V) of Comparative Example 1.
Figure 12:
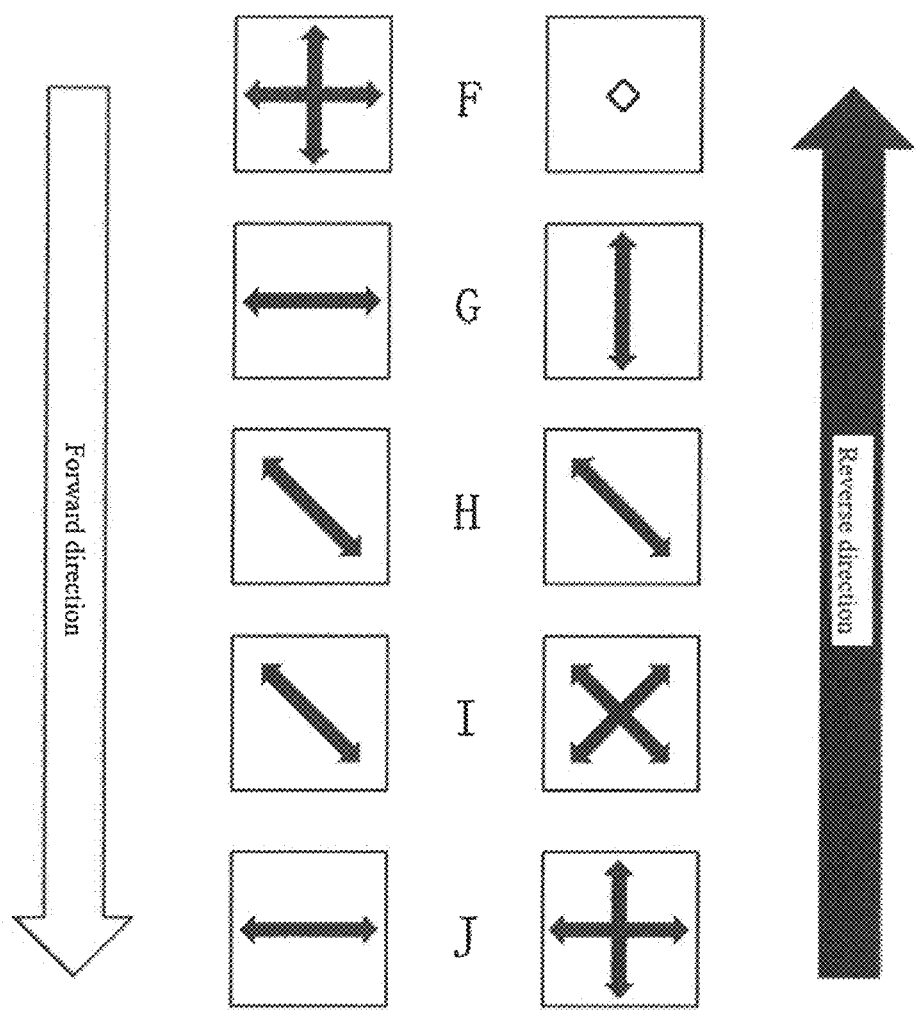
FIG. 12 is a schematic view showing transmission polarization directions in the optical isolator (VI) of Comparative Example 1.
Figure 13:
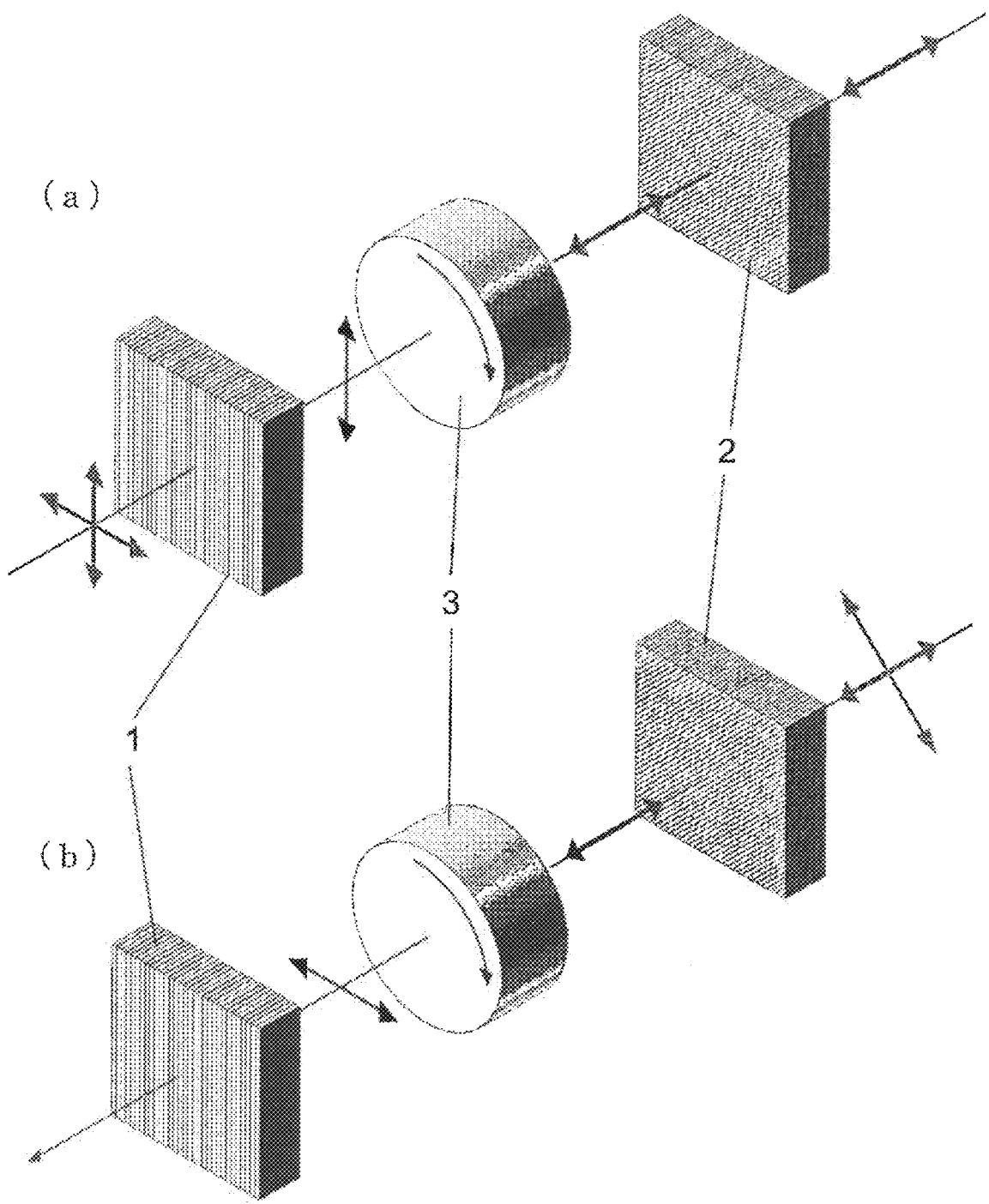
FIG. 13 are schematic drawings to illustrate the constitution of a polarization dependent optical isolator, wherein (a) is a schematic drawing when light enters to the polarization dependent optical isolator in a forward direction, and (b) is schematic drawing when light enters to the polarization dependent optical isolator in a reverse direction.

Two of the produced optical isolators were disposed in close vicinity to each other as shown in FIGS. 9 and 10. FIGS. 11 and 12 show transmission polarization directions in the optical isolators 105 and 106 respectively. The optical isolator 105 and the optical isolator 106 in FIGS. 9 and 10 are referred to as an optical isolator (V) and an optical isolator (VI) respectively for convenience. The points "A"-"E" in FIG. 9 correspond to the points "A"-"E" in FIG. 11, and the points "F"-"J" in FIG. 9 correspond to the points "F"-"J" in FIG. 12. Every optical isolator was constituted so as to transmit light in the forward direction and not to transmit light in the reverse direction. They were each constituted so as to have outgoing light in a forward direction with the polarization direction being parallel to the plane of the flat base 9 through the ½ wave plate 4. Incidentally, they were constituted so as to have the magnetic field of the magnet 8 in the optical isolator (V) 105 and the magnetic field of the magnet 8 in the optical isolator (VI) 106 that were in the opposite directions to each other.

On the optical isolator of Comparative Example 1, the insertion loss and the isolation were evaluated. The insertion loss of the optical isolator (V) 105 was 0.34 dB in the forward direction. The insertion loss was 24 dB when it was measured for transmitted light entered in a reverse direction in order to evaluate the isolation, wherein the polarized light had the same direction with the transmission polarization direction of the second polarizer 2 after passing the ½ wave plate 4.

The insertion loss of the optical isolator (VI) 106 was 0.36 dB when it was measured in the forward direction in the same way as in the above. The insertion loss was 22 dB when light entered in a reverse direction.

Examples 1 and 2 described above revealed that the inventive optical isolator module, with each magnetic field of the magnet 8 being in the same direction, showed good insertion loss and isolation without being degraded. On the other hand, in the two adjacent optical isolators of Comparative Example 1, it was revealed that the insertion loss was increased and the isolation was degraded compared to those of the inventive optical isolator module since the magnetic fields of the magnet 8 in the isolators interfered with each other.

From the above, it has revealed that the present invention makes it possible to prevent degradation of the performance such as increase of insertion loss and degradation of isolation due to magnetic field interference even when a plurality of optical isolators are close to each other.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. An optical isolator module, comprising:
a plurality of optical devices, each comprising a polarizer and a Faraday rotator and each being configured to have an optical isolator function upon application of a magnetic field to the Faraday rotator, and
a magnet to apply the magnetic field to the Faraday rotator in each of the plurality of optical devices, wherein
at least two optical devices of the plurality of optical devices are disposed with respective optical axes in parallel and configured to have the optical isolator functions in opposite directions from each other,
each magnetic field applied with the magnet is in a same direction,
each of the plurality of optical devices is tilted in a same tilt direction and is configured such that an individual incident surface of the plurality of optical devices is tilted away from a plane that is perpendicular to a transmission direction of light, and
the magnet is a sole and plate-shaped magnet.

2. The optical isolator module according to claim 1, wherein the number of the optical devices is two.

3. The optical isolator module according to claim 1, wherein the plurality of optical devices are set on a plane of a flat base, and a polarization direction of outgoing light in a forward direction is parallel to the plane of the flat base.

4. The optical isolator module according to claim 1, wherein the optical isolator function allows light transmission in a direction and prevents light transmission opposite the direction.

* * * * *